United States Patent [19]

Koreska

[11] Patent Number: 5,403,872

[45] Date of Patent: Apr. 4, 1995

[54] SOLID CORRECTION MATERIAL

[75] Inventor: Peter Koreska, Vienna, Austria

[73] Assignee: Kores Holding Zug AG, Switzerland

[21] Appl. No.: 167,023

[22] Filed: Dec. 16, 1993

[30] Foreign Application Priority Data

Dec. 16, 1992 [CH] Switzerland .......... 3836/92

[51] Int. Cl.⁶ .......... C09D 10/00; C09D 5/00; C09D 11/00
[52] U.S. Cl. .......... 523/161; 524/277; 524/320; 524/322; 524/379; 524/394; 524/430; 106/19 R; 106/19 A; 106/20 A; 106/271; 106/272; 106/401
[58] Field of Search .......... 523/161; 524/277, 320, 524/322, 379, 394, 430; 106/19 R, 19 A, 271, 272, 401, 20 A

[56] References Cited

U.S. PATENT DOCUMENTS

| | | | |
|---|---|---|---|
| 4,808,227 | 2/1989 | Yuasa et al. | 523/161 |
| 4,830,670 | 5/1989 | Danyu | 523/161 |
| 4,992,502 | 2/1991 | Loftin et al. | 524/277 |
| 5,236,494 | 8/1993 | Kano | 106/19 R |

FOREIGN PATENT DOCUMENTS

| | | |
|---|---|---|
| 0422929A2 | 4/1991 | European Pat. Off. |
| 51-106523 | 9/1976 | Japan . |
| 3008465 | 1/1988 | Japan . |
| 63-199777 | 8/1988 | Japan . |
| 3280783 | 11/1988 | Japan . |
| 1-298704 | 12/1989 | Japan . |
| 2129274 | 5/1990 | Japan . |
| 4178474 | 6/1992 | Japan . |

*Primary Examiner*—Tae H. Yoon
*Attorney, Agent, or Firm*—Oliff & Berridge

[57] ABSTRACT

A solid correction material for covering writing or drawing errors on paper is disclosed. The correction material may be formed into a stick and housed in hollow body and is composed of: (a) 5–40 wt % of a thermoplastic synthetic resin, preferably a homo- or copolymer based on (meth)acrylic compounds; (b) 10–70 wt % of a pigment, preferably a titanium dioxide pigment; (c) 5–20 wt % of a mono- or polyvalent alcohol, preferably glycerin being preferred; (d) 5–30 wt % of carrier mixture composed of (i) a fatty acid with 12 to 32 carbon atoms or a salt of a fatty acid, with stearate being preferred, and (ii) at least one member selected from the group consisting of a polyolefin and an ester wax, possibly 5 to 15 wt % water; and (e) 0 to 10 wt % of conventional additives, such as defoaming agents, dyes, aroma substances, and preservatives. The correction material is solid at room temperature and has a viscosity between about 100 and about 150 cPa.s at 90° C.

19 Claims, No Drawings

SOLID CORRECTION MATERIAL

The present invention relates to a solid correction material for covering writing, typing or drawing errors on recording material, such as paper. The present invention also relates to counterpart Swiss Patent Application No. 3836/92, the entire disclosure of which is incorporated herein by reference.

BACKGROUND OF THE INVENTION

Writing errors on paper are conventionally corrected by covering the error with liquid correction agent containing a covering white pigment using an application means such as a brush, sponge, or brush flocked with a fuzzy covering. The liquid correction agent and application means are usually offered as a packaged unit. The liquid correction agent, however, typically forms a drop on the underside of the application means. Consequently, this drop of liquid correction agent is uncontrollably transferred to the paper and forms ugly "correction bumps" that are slow drying and difficult to overwrite. To overcome this problem, excess liquid correction agent is usually wiped away from the application means at the edge of a container opening. The wiped away liquid correction agent, however, quickly hardens at the edge of the container such that when the application means is subsequently wiped off, lumps of pigment or thickened liquid correction agent are transferred to the application means. The lumps of pigment or thickened liquid correction agent cause the liquid correction agent to be non-uniformly applied to the paper.

Prior liquid correction agents usually contain environmentally hazardous solvents and suspension agents. Solid components in liquid correction agents, however, tend to precipitate out of solution, which concomitantly shortens the shelf life of conventional liquid correction agents. Further, conventionally used solvents often dissolve ink or toner dyes in the area to be corrected either causing the dyes to color or smear the correction agent. As a result, clean covering of writing errors is virtually impossible. In addition, so-called reactive papers, such as NCR and thermosensitive papers, have an oily dye-developing layer that can be activated by solvents found in conventional liquid correction agents.

One replacement for liquid correction agents is a correction stick made of a solid correction material containing a covering pigment that is rubbed off on the correction area. Problems with prior correction sticks include poor adhesion to paper (JPLO 51-106523; JP 89-298704) or non-uniform application. JP 63-199777 discloses a correction material composed mainly of a white pigment, a waxy carrier, and a binder made of an ethylene-vinyl acetate-copolymer that rubs off and adheres to the paper. The disclosed correction material, however, ages quickly and after a short time, cannot be uniformly applied because ink flow or abrasion is adversely affected. As a result, the surface of the applied correction material is non-uniform and difficult to overwrite.

SUMMARY OF THE INVENTION

An object of the present invention is to provide a solid correction material that overcomes the disadvantages of the prior art. According to the present invention, the solid correction material can be easily and uniformly applied without high pressure, quickly bonds to paper, forms an attractive non-shiny surface that is easily overwritten and is non-reactive with paper, dye developing layers or ink and toner dyes.

DETAILED DESCRIPTION OF PREFERRED EMBODIMENTS

The above and other objects are achieved by a correction material comprising:

a) 5-40 wt % of a thermoplastic synthetic resin, preferably a homo- or copolymer based on (meth)acrylic compounds;

(b) 10-70 wt % of a pigment, preferably a titanium dioxide pigment, (c) 5-20 wt % of a mono- or polyvalent alcohol;

(d) 5-30 wt % of a carrier mixture, comprising
 (i) a fatty acid containing 12 to 32 carbon atoms or a salt of a fatty acid and
 (ii) at least one member selected from the group consisting of a polyolefin wax and an ester wax; and (e) 0-10 wt % of conventional additives, defoaming agents, dyes, aromatic substances and preservatives. The correction material is preferably solid at room temperature and preferably has a viscosity between about 100 and about 150 cPa.s at 90° C.

The correction material of the present invention overcomes the disadvantages of the prior art despite the presence of a thermoplastic synthetic resin that is required for adhesion of the pigments to paper; does not age, become brittle or hard; and thus can always be uniformly applied. The present invention can be readily used on NCR, facsimile and photocopier papers. It is believed that the resistance to aging is accomplished by the combination of a mono- or polyvalent alcohol with a carrier mixture of a medium fatty acid and a polyolefin and/or ester wax.

When exposed to air, prior solid correction materials become dry or hard at the exposed surface resulting in a correction material that non-uniformly rubs off onto paper. To overcome this problem, a combination of stearic acid or a salt of stearic acid (hereinafter "stearate") and glycerin is most preferably used in the carrier. It is believed that stearate and glycerin form tertiary structures that prevent evaporation of the glycerin. Thus, if a similar or other component is substituted for the stearate, glycerin alone does not prevent drying at the exposed surface. Likewise, if the glycerin is replaced by a higher alcohol or a solvent with a high evaporation number, the stearate does not completely prevent the exposed surface from drying. The present inventor has discovered that the combination of stearate and glycerin advantageously and unexpectedly provides a correction material that always remains moist and "fresh", even when exposed to air.

The percentage of the mono- or polyvalent alcohol in the correction material in the case of other mono- or polyvalent alcohols is between about 5 and about 20 wt % depending on the evaporation number. Glycerin is preferably added in an amount of about 5 to about 15 wt % of the correction material. Low-solvent alcohols are preferably used, however, suitable mono- and polyvalent alcohols include, but are not limited to, isopropanol, isobutanol, glycol, polyalkylene glycol, especially polyethylene glycol, trimethylol propane, sugar alcohols, such as sorbite, pentaerythrite, etc., and mixtures thereof.

The ratio of stearate or fatty acid to polyolefin wax, especially polyethylene wax, is preferably about 1:1, otherwise a higher percentage of wax would considerably increase melt viscosity make large-scale manufacture of the correction material virtually impossible. On the other hand, tests have shown that the optimum ratio of stearate to ester wax is about 1:2.

According to the present invention, both natural and synthetic waxes can be used. For instance, natural waxes, animal waxes, such as beeswax or plant waxes, such as carnauba wax, are especially suitable. Mineral waxes, such as montan wax, and waxes based on petroleum, especially paraffin, are also suitable. Of the synthetic waxes, Fischer-Tropf waxes and polyolefin waxes, especially nonpolar polyethylene wax, among others, are suitable. Ester waxes, especially partially saponified ester waxes, are also highly suitable.

According to the present invention the wax has a penetration number of less than 6 (determined according to DIN 51 580 and measured with a conventional penetrometer or consistometer). Waxes having higher penetration numbers, such as polyester waxes, cause embrittlement and strength loss in the correction material. It has also been found that waxes with a softening point of less than 60° C. lead to aging of the material. Thus, waxes with a softening point above about 60° C. are preferred.

According to the present invention, the binder is a thermoplastic synthetic resin, preferably a solvent-free dispersion of an acrylic resin based on n-butylacrylate in water. Other suitable binders include, but are not limited to, a thermoplastic resin based on (meth)acrylic acid esters, vinyl acetate or copolymers thereof; a copolymer of any of the members of the group consisting of vinyl acetate, ethylene, vinyl chloride, maleic acid dibutyl ester, acrylic acid ester and "versatic" acid vinyl ester; and/or a copolymer based on styrene/acrylic acid esters.

The minimum film-forming temperature (MFT) (determined according to DIN 53 787) of the thermoplastic synthetic resin is preferably from about 50° to about 25° C. The solvent components in the material lower the MFT value to below 10° C., resulting in excellent film-forming properties.

According to the present invention, the amount of pigment used is determined by its covering power. Preferably, the percentage of pigment in the correction material is from about 10 to about 70 wt %, more preferably between about 30 and about 60 wt %. Titanium dioxide pigments, especially anatase and rutile pigments, are preferably used. Of course, other covering pigments are suitable as well. In addition, the correction material can contain colored pigments or dyes for correcting errors on colored paper.

Specially modified alcohols or a siloxane adduct may be added to defoam the mixture. Of course, the correction material of the present invention can contain other conventional additives, such as emulsifiers, surfactants, aroma substances, etc.

The correction material also preferably contains water in an amount between about 5 and about 15%, preferably between about 8 to about 12%. Because the covering material of the present invention is highly hygroscopic and water is a good transition promoter to the paper, the water in the correction material rapidly penetrates the paper fibers after abrasion, thereby transporting adhesives and binders into the paper. Consequently, an overwritable and wipeoff-resistant bond is created between the correction material and the paper within seconds of application. The water also causes the pigments to be deposited not only at the surface but also partially in the pores of the paper. The resultant applied correction material is slightly structured and is not oily or glossy, which is unattractive and undesirable. If, however, the water content is too high, the correction material can smear and begin to separate, thereby becoming difficult to work with.

According to the present invention, correction sticks are preferably manufactured by first melting a carrier and a binder together to form a melt and then finely suspending a pigment in the melt. To prevent the pigment and carrier form separating when poured into a mold, the additives for the correction material are selected so that the melt, adjusted to 90° C., has a viscosity of about 100 to about 150 cPa.s. The covering material is preferably molded to form a stick of the "lipstick," "Tights Stick," "DeoStift," "Laufmaschenstopp," etc. types. After cooling to room temperature, the stick is ready to use by guiding it over the areas to be corrected so that the abraded coating material covers the errors to form a clean and overwritable surface.

The invention will be further illustrated in the following, non-limiting examples. These examples are illustrative only and do not limit the claimed invention regarding the materials, conditions, process parameters and the like recited herein.

EXAMPLE 1

Correction material 1 has the following composition:

| | |
|---|---|
| Glycerin | 10.0 parts by weight |
| PLEXTOL D541 TM | 20.0 parts by weight |
| H$_2$O | 9.6 parts by weight |
| Defoamer (DEHYDRAN 1620 TM, Henkel, Germany) | 0.4 parts by weight |
| Sodium stearate | 5.0 parts by weight |
| Hoechst wax PE 520 TM | 5.0 parts by weight |
| Rutile pigment (Kronos RN 56) | 50.0 parts by weight |
| TOTAL | 100.0 parts by weight |

PLEXTOL D541 TM (Röhm Company, Germany) is an aqueous dispersion of a thermoplastic and self-crosslinking acrylic polymer having a minimum film-forming temperature of 18° C. Hoechst wax PE 520 TM (Hoechst Company, Germany) is a highly viscous nonpolar polyethylene wax with a drop point of 117°–122° C. Kronos RN 56 is a rutile pigment with a relative scattering power of 100%, determined using DIN 53 165. A pigment's relative scattering power indicates its brightening and covering power.

EXAMPLE 2

Correction material 2 has the following composition:

| | |
|---|---|
| Glycerin | 7.0 parts by weight |
| MOWILITH 772 TM | 15.0 parts by weight |
| H$_2$O | 9.8 parts by weight |
| Defoamer (DEHYDRAN 1620 TM, Henkel, Germany) | 0.4 parts by weight |
| Sodium stearate | 8.0 parts by weight |
| Hoechst wax X55 TM | 5.0 parts by weight |
| BAYERTITAN (R-KB-2) TM | 45.0 parts by weight |
| TOTAL | 100.0 parts by weight |

MOWILITH TM (Hoechst Company, Germany) is a plasticizer-free aqueous dispersion based on (meth)acrylic acid esters having a minimum film-forming temperature of 13° C. Hoechst wax X55 TM (Hoechst Company, Germany) is a partially saponified ester wax with a drop point of 96°–106° C. Bayertitan (R-KB-2) TM (Bayer Company, Germany) n is a titanium dioxide pigment.

Correction materials 1 and 2 were manufactured as generally described above and poured into molds. Both correction materials could be easily and uniformly abraded, even after being exposed to air. Homogeneous and overwritable covering surfaces were obtained.

What is claimed is:

1. A composition for covering writing, typing or drawing errors on recording material, comprising:
   (a) 5–40 wt % of a thermoplastic synthetic resign;
   (b) 10–70 wt % of a pigment;
   (c) 5–20 wt % of a mono- or polyvalent alcohol;
   (d) 5–30 wt % of a carrier comprising
      (i) a fatty acid containing 12 to 32 carbon atoms or a salt of a fatty acid, and
      (ii) at least one member selected from the group consisting of a polyolefin wax and an ester wax having a penetration number of less than 6;
   (e) 0–10 wt % of an additive selected from the group consisting of: defoaming agents, dyes aroma substances and preservatives; and
   (f) about 5 to about 15 wt % of water.

2. The composition of claim 1, wherein the thermoplastic synthetic resin is a homo- or copolymer based on (meth)acrylic compounds.

3. The composition of claim 1, wherein the pigment is a titanium dioxide pigment.

4. The composition of claim 1, wherein the polyvalent alcohol is glycerin and the fatty acid contained in the carrier is stearic acid or a salt of stearic acid.

5. The composition of claim 1, wherein the thermoplastic synthetic resin has a minimum film-forming temperature of about 5° to about 25° C.

6. The composition of claim 5, wherein the minimum film-forming temperature is about 5 to about 15° C.

7. The composition of claim 5, wherein the minimum film-forming temperature is about 10° C.

8. The composition of claim 1, wherein the wax has a softening point above about 60° C.

9. The composition of claim 7, wherein the wax is polyethylene wax.

10. The composition of claim 4, wherein a weight ratio of the fatty acid to polyolefin wax is about 1:1.

11. The composition of claim 4, wherein a weight ratio of the fatty acid to ester wax is about 1:2.

12. The composition of claim 1, wherein said water is present in an amount of about 8 to about 12 wt %.

13. The composition of claim 1, wherein the composition is a solid at room temperature and the composition has a viscosity between about 100 and about 150 cPa.s at 90° C.

14. A method for covering writing, typing or drawing on recording material, comprising:
   applying the composition of claim 1 to the writing, typing or drawing.

15. The method of claim 14, wherein the writing, typing or drawing comprises toner.

16. A housing device comprising a hollow body containing the composition of claim 1 disposed therein.

17. The housing device of claim 16, wherein the hollow body is a pen.

18. A method for manufacturing a correction stick, comprising:
   (a) adjusting the temperature of the composition of claim 1 to obtain a viscosity between about and about 150 cPa.s; and
   (b) inserting the composition of claim 1 into a hollow body.

19. The method of claim 18, wherein a pigment is added to a hot melt of the composition after the viscosity between about 100 and about 150 cPa.s is obtained in step (a).

* * * * *